US012651686B2

(12) United States Patent
Yoshida et al.

(10) Patent No.: US 12,651,686 B2
(45) Date of Patent: Jun. 9, 2026

(54) SUPERCONDUCTING MAGNET DEVICE AND CRYOSTAT

(71) Applicant: SUMITOMO HEAVY INDUSTRIES, LTD., Tokyo (JP)

(72) Inventors: Jyun Yoshida, Yokosuka (JP); Atsushi Hashimoto, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 282 days.

(21) Appl. No.: 18/604,414

(22) Filed: Mar. 13, 2024

(65) Prior Publication Data

US 2024/0258003 A1 Aug. 1, 2024

Related U.S. Application Data

(63) Continuation of application No. PCT/JP2022/033123, filed on Sep. 2, 2022.

(30) Foreign Application Priority Data

Sep. 16, 2021 (JP) ................................ 2021-150842

(51) Int. Cl.

| | |
|---|---|
| ***H01F 6/04*** | (2006.01) |
| ***F17C 3/08*** | (2006.01) |
| ***F17C 13/00*** | (2006.01) |
| ***F17C 13/08*** | (2006.01) |
| ***H01F 6/06*** | (2006.01) |

(52) U.S. Cl.

CPC ............... *H01F 6/04* (2013.01); *F17C 3/085* (2013.01); *F17C 13/007* (2013.01); *F17C 13/087* (2013.01); *H01F 6/06* (2013.01); *F17C 2270/0527* (2013.01); *F17C 2270/0536* (2013.01)

(58) Field of Classification Search

None

See application file for complete search history.

(56) References Cited

U.S. PATENT DOCUMENTS

| | | | | |
|---|---|---|---|---|
| 5,432,669 A * | 7/1995 | Nemoto | B60L 13/04 | 335/216 |
| 6,147,844 A * | 11/2000 | Huang | H02H 7/001 | 361/19 |
| 6,735,848 B1 * | 5/2004 | Markiewicz | H01F 41/048 | 29/605 |
| 7,196,883 B2 | 3/2007 | Tsuchiya et al. | | |

(Continued)

FOREIGN PATENT DOCUMENTS

| | | | |
|---|---|---|---|
| CN | 101102100 B * | 2/2011 | H01L 23/5227 |
| CN | 105469927 A * | 4/2016 | H01F 6/04 |

(Continued)

*Primary Examiner* — Jenna M Maroney

(74) *Attorney, Agent, or Firm* — HEA Law PLLC

(57) ABSTRACT

A superconducting magnet device includes a superconducting coil disposed in a cryogenic environment; and a protection diode disposed in the cryogenic environment and connected to the superconducting coil, the protection diode being disposed such that a direction of a magnetic field generated by the superconducting coil on a pn junction surface of the protection diode forms an angle within about 30 degrees with respect to a normal line of the pn junction surface.

5 Claims, 5 Drawing Sheets

(56) References Cited

U.S. PATENT DOCUMENTS

| | | | | | |
|---|---|---|---|---|---|
| 8,583,201 | B2 * | 11/2013 | Wu | H01F 6/02 505/162 |
| 10,699,830 | B2 * | 6/2020 | Hamada | H01F 6/06 |
| 11,450,440 | B2 * | 9/2022 | Wong | G21B 1/13 |
| 2005/0231859 | A1 * | 10/2005 | Huang | G01R 33/3815 361/19 |
| 2006/0158795 | A1 * | 7/2006 | Tsuchiya | H02H 7/001 361/19 |
| 2017/0250018 | A1 * | 8/2017 | Xu | H01F 6/04 |
| 2022/0375629 | A1 * | 11/2022 | Wong | G21B 1/13 |
| 2024/0304368 | A1 * | 9/2024 | Ebara | H01F 6/02 |
| 2024/0321493 | A1 * | 9/2024 | Ebara | H01F 6/02 |
| 2025/0029762 | A1 * | 1/2025 | Ebara | H01F 6/02 |
| 2025/0079056 | A1 * | 3/2025 | Hashimoto | H01F 6/06 |
| 2025/0279231 | A1 * | 9/2025 | Ebara | H01F 6/04 |

FOREIGN PATENT DOCUMENTS

| | | | | | |
|---|---|---|---|---|---|
| CN | 120032963 | A | * | 5/2025 | H01F 6/00 |
| EP | 0468415 | B1 | * | 10/1998 | G01R 33/3815 |
| JP | S61265805 | A | | 11/1986 | |
| JP | H09103065 | A | | 4/1997 | |
| JP | H10189328 | A | | 7/1998 | |
| JP | 2000182823 | A | * | 6/2000 | |
| JP | 2003007526 | A | * | 1/2003 | |
| JP | 2006073571 | A | | 3/2006 | |
| JP | 4699293 | B2 | | 6/2011 | |
| JP | 4802762 | B2 | | 10/2011 | |
| JP | 2012253295 | A | | 12/2012 | |
| JP | 5255425 | B2 | | 8/2013 | |
| WO | WO-9013824 | A1 | * | 11/1990 | G01R 33/3815 |
| WO | WO-2018211765 | A1 | * | 11/2018 | H01F 6/06 |

* cited by examiner

SUPERCONDUCTING MAGNET DEVICE AND CRYOSTAT

CROSS-REFERENCE TO RELATED APPLICATIONS

This is a bypass continuation of International PCT Application No. PCT/JP2022/033123, filed on Sep. 2, 2022, which claims priority to Japanese Patent Application No. 2021-150842, filed on Sep. 16, 2021, which are incorporated by reference herein in their entirety.

BACKGROUND

Technical Field

A certain embodiment of the present invention relates to a superconducting magnet device and a cryostat.

Description of Related Art

In general, a superconducting magnet device is provided with a protection circuit for protecting a superconducting coil when quenching occurs. As an example of the protection circuit, there is a type having a diode connected in parallel with the superconducting coil. When a voltage across the superconducting coil that has been transitioned to a normal conducting state by quenching reaches a forward voltage of the diode, the diode is electrically conducted and operates as a voltage limiter circuit. A current can be attenuated in a closed circuit formed by the superconducting coil and the diode, and overheating or damage of the superconducting coil can be prevented to protect the superconducting coil.

SUMMARY

According to a certain aspect of the present invention, there is provided a superconducting magnet device including a superconducting coil disposed in a cryogenic environment, and a protection diode disposed in the cryogenic environment and connected to the superconducting coil. The protection diode is disposed such that a direction of a magnetic field generated by the superconducting coil on a pn junction surface of the protection diode forms an angle within about 30 degrees with respect to a normal line of the pn junction surface.

According to a certain aspect of the present invention, there is provided a cryostat including a vacuum container, a cryocooler installed in the vacuum container, a superconducting coil disposed in the vacuum container and cooled by the cryocooler, and a protection diode disposed in the vacuum container, cooled by the cryocooler, and connected to the superconducting coil. The protection diode is disposed such that a direction of a magnetic field generated by the superconducting coil on a pn junction surface of the protection diode forms an angle within about 30 degrees with respect to a normal line of the pn junction surface.

DETAILED DESCRIPTION

Figure 1:
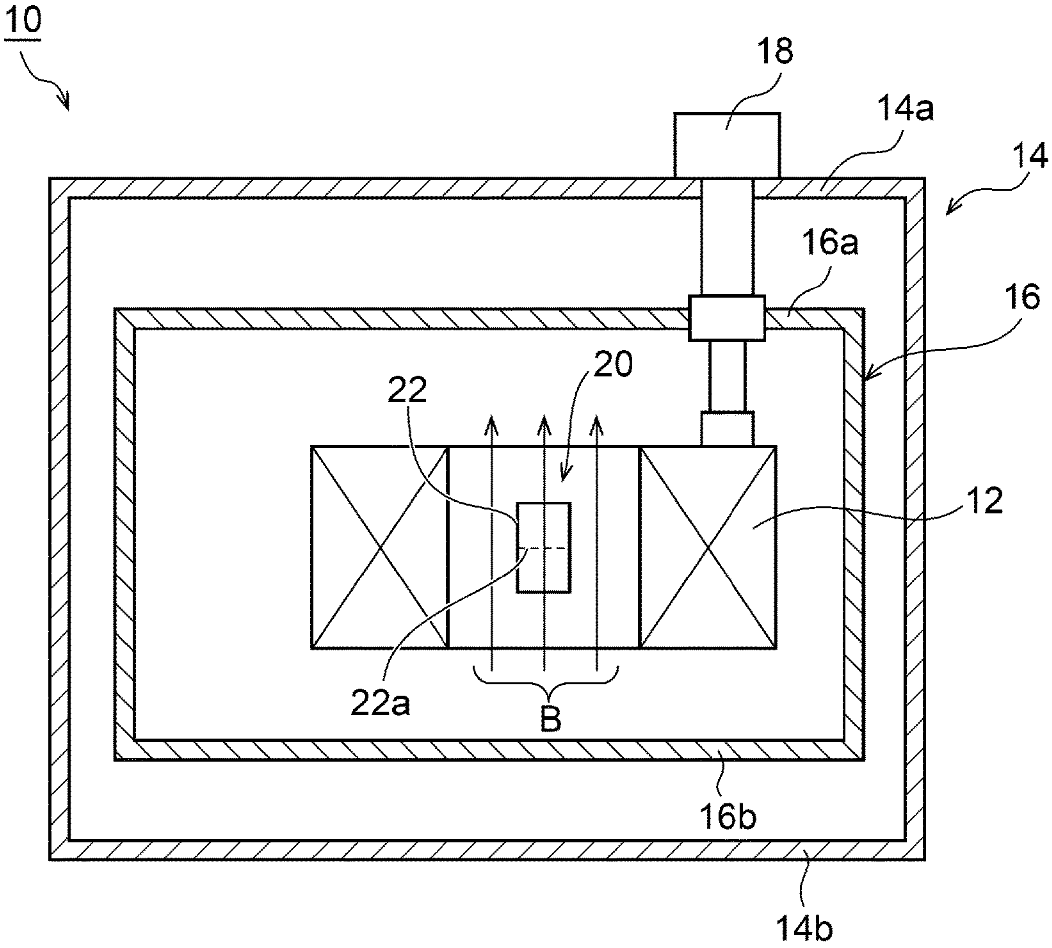
FIG. 1 is a diagram schematically showing a superconducting magnet device according to an embodiment.

As a result of earnest studies on a protection circuit of a superconducting magnet device, the present inventors have recognized the following problems. The protection circuit is usually disposed in a cryogenic environment together with the superconducting coil. Due to spatial constraints, the diode may be installed at a location where the diode is exposed to a strong leaked magnetic field from the superconducting coil. The present inventors have found that in a diode that is exposed to a high magnetic field at a cryogenic temperature, there is a case where a forward voltage of the diode is larger than expected. In this case, there is a concern that an excessive voltage is applied across the diode before the diode is electrically conducted at the time of occurrence of quenching, and thus a risk of occurrence of discharge or ground fault is increased.

It is desirable to provide a technique that is helpful for operating a protection diode of a superconducting magnet device at an appropriate forward voltage.

According to the certain aspect of the present invention, it is possible to provide a technique that is helpful for operating the protection diode of the superconducting magnet device at an appropriate forward voltage.

Hereinafter, an embodiment for carrying out the present invention will be described in detail with reference to the drawings. In the description and drawings, the same or equivalent components, members, and processes are denoted by the same reference numerals, and overlapping descriptions are omitted as appropriate. The scales and shapes of the illustrated parts are set for convenience in order to facilitate explanation, and should not be construed in a limited manner unless otherwise specified. The embodiment is an example and does not limit the scope of the present invention. All features and combinations thereof described in the embodiment are not necessarily essential to the invention.

Figure 2:
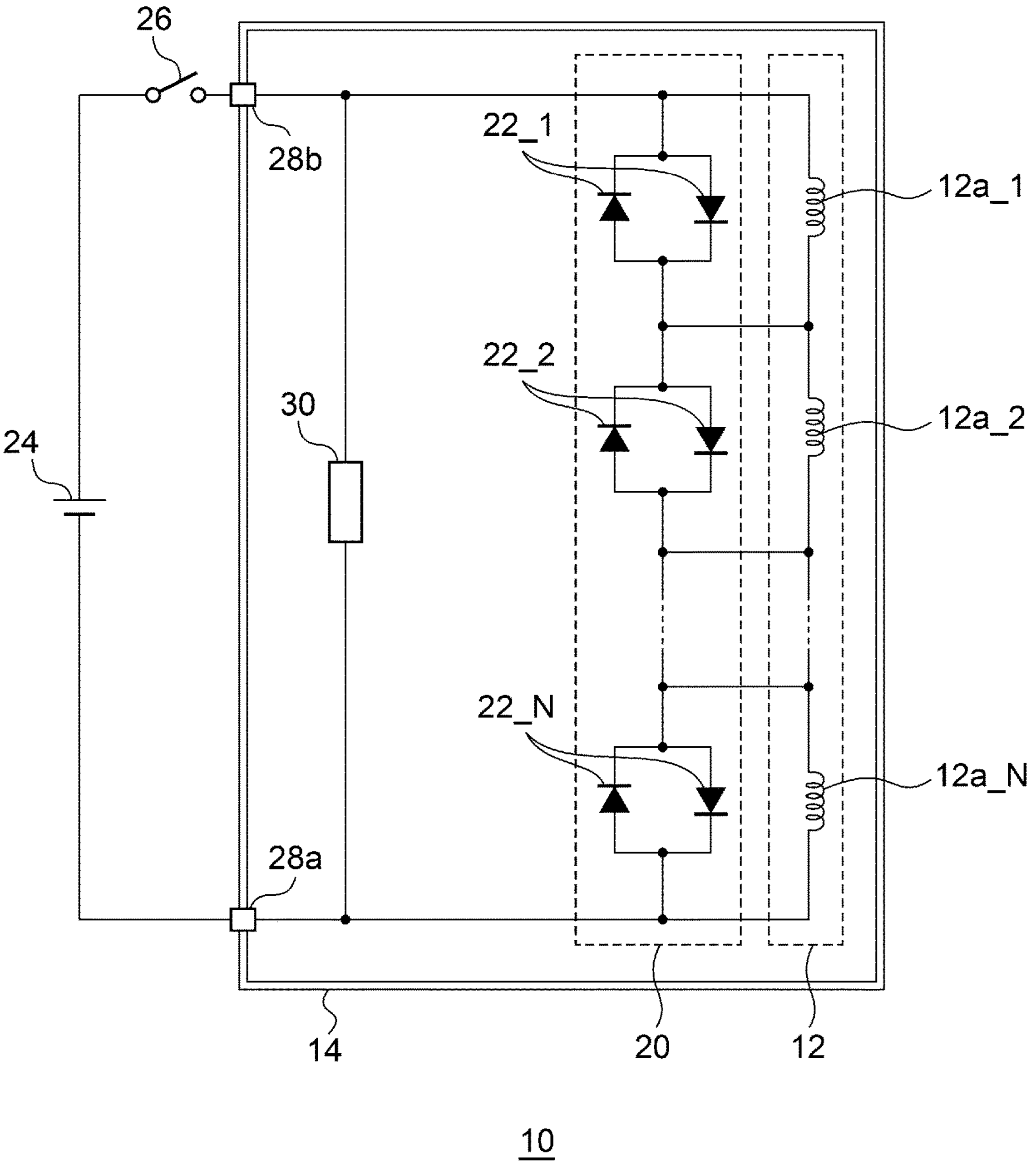
FIG. 2 is a circuit diagram showing an example of a protection circuit of the superconducting magnet device shown in FIG. 1.

FIG. 1 is a diagram schematically showing a superconducting magnet device 10 according to an embodiment. FIG. 2 is a circuit diagram showing an example of a protection circuit of the superconducting magnet device 10 shown in FIG. 1.

The superconducting magnet device 10 can be mounted on a high-magnetic field utilization device as a magnetic field source of, for example, a single crystal pulling device, a nuclear magnetic resonance (NMR) system, a magnetic resonance imaging (MRI) system, an accelerator such as a cyclotron, a high energy physical system such as a nuclear fusion system, or other high-magnetic field 15 utilization devices (not shown) and can generate a high magnetic field (for example, 10 T or more) required for the device.

The superconducting magnet device 10 includes a superconducting coil 12, a vacuum container 14, a radiation shield 16, a cryocooler 18, and a protection circuit 20 including a protection diode 22.

The superconducting coil 12 is disposed in the vacuum container 14 together with the protection circuit 20. The superconducting coil 12 is thermally coupled to the cryocooler 18, such as a two-stage Gifford-McMahon (GM) cryocooler, installed in the vacuum container 14 and is used in a state of being cooled to a cryogenic temperature equal to or lower than a superconducting transition temperature. The superconducting coil 12 can generate a magnetic field B inside the coil along a center axis of the coil. In this embodiment, the superconducting magnet device 10 is configured as a so-called conduction cooling type in which the superconducting coil 12 is directly cooled by the cryocooler 18. Note that, in another embodiment, the superconducting magnet device 10 may be configured as an immersion cooling type in which the superconducting coil 12 is immersed in a cryogenic liquid refrigerant such as liquid helium.

The vacuum container 14 is an adiabatic vacuum container that provides a cryogenic vacuum environment suitable for bringing the superconducting coil 12 into a superconducting state, and is also called a cryostat. Typically, the vacuum container 14 has a columnar shape or a cylindrical shape with a hollow portion in a central portion thereof. Therefore, the vacuum container 14 includes substantially flat circular or annular top plate **14*a* and bottom plate 14*b*, and a cylindrical side wall (cylindrical outer peripheral wall, or coaxially disposed cylindrical outer peripheral wall and inner peripheral wall) connecting the top plate and the bottom plate. The cryocooler 18 may be installed on the top plate 14*a* of the vacuum container 14. The vacuum container 14** is formed of, for example, a metallic material such as stainless steel or other suitable high-strength materials to withstand an ambient pressure (for example, atmospheric pressure).

The radiation shield 16 is disposed to surround the superconducting coil 12 within the vacuum container 14. The radiation shield 16 includes a top plate **16*a* and a bottom plate 16*b* facing the top plate 14*a* and the bottom plate 14*b* of the vacuum container 14, respectively. The top plate 16*a* and the bottom plate 16*b* of the radiation shield 16 have substantially flat circular or annular shapes similar to the vacuum container 14. Further, the radiation shield 16 includes a cylindrical side wall (cylindrical outer peripheral wall or coaxially disposed cylindrical outer peripheral wall and inner peripheral wall) connecting the top plate 16*a* and the bottom plate 16*b*. The radiation shield 16 is formed of, for example, pure copper (for example, oxygen-free copper, tough pitch copper, or the like), or other highly thermally conductive metals. The radiation shield 16 can block radiant heat from the vacuum container 14, and thermally protect a low-temperature section such as the superconducting coil 12, which is disposed inside the radiation shield 16 and cooled to a lower temperature than the radiation shield 16**, from the radiant heat.

A first cooling stage of the cryocooler 18 is thermally coupled to the top plate **16*a* of the radiation shield 16, and a second cooling stage of the cryocooler 18 is thermally coupled to the superconducting coil 12 inside the radiation shield 16. During operation of the superconducting magnet device 10, the radiation shield 16 is cooled to a first cooling temperature, for example, 30K to 70K, by the first cooling stage of the cryocooler 18, and the superconducting coil 12 is cooled to a second cooling temperature lower than the first cooling temperature, for example, 3K to 20K (for example, about 4K) by the second cooling stage of the cryocooler 18**.

The protection diode 22 is connected to the superconducting coil 12 and is disposed in a cryogenic environment (for example, 20 K or lower) together with the superconducting coil 12. It is also possible in principle to dispose the protection circuit 20 in a surrounding environment outside the vacuum container 14. However, in that case, the number of current introduction terminals that need to be provided in the vacuum container 14 for connecting the protection diode 22 and the superconducting coil 12 increases, and the structure becomes complicated. In addition, a current path from the protection diode 22 to the superconducting coil 12 also serves as a path for heat entry from the surrounding environment, and thus the heat input to the superconducting coil 12 increases. It is advantageous to dispose the protection circuit 20 in the vacuum container 14 to eliminate such a disadvantage.

Although details will be described later, the protection diode 22 is disposed such that a direction of the magnetic field B generated by the superconducting coil 12 on a pn junction surface **22*a* of the protection diode 22 is not perpendicular to a normal line of the pn junction surface 22*a* (preferably, the direction of the magnetic field B is substantially parallel to the normal line of the pn junction surface 22*a*). The protection diode 22 is disposed in a region in which the magnetic field B acts, for example, inside the superconducting coil 12**.

As shown in FIG. 2, the superconducting coil 12 may have a configuration in which the superconducting coil 12 is divided into a plurality of (for example, N, N is any natural number) coil portions **12*a*_1 to 12*a*_N, and the coil portions 12*a* are connected in series. For each of the coil portions 12*a*_1 to 12*a*_N, protection diodes 22_1 to 22_N are connected in parallel to the coil portions 12*a*_1 to 12*a*_N. Such a divided configuration is advantageous, particularly when the superconducting coil 12 is large, because the voltage applied across the superconducting coil 12** at the time of occurrence of quenching can be reduced as compared to a non-divided coil configuration.

The superconducting magnet device 10 may have a plurality of the superconducting coils 12, and in this case, the protection diode 22 may be provided for each of the superconducting coils 12. In addition, even in this case, each superconducting coil 12 may be divided into a plurality of the coil portions **12*a*, and the protection diode 22 may be provided for each of the coil portions 12*a***.

Each of the protection diodes 22_1 to 22_N includes a pair of diodes connected in parallel to each other in opposite directions. In this way, regardless of a direction (upward or downward in FIG. 2) of the voltage generated in the superconducting coil 12 (or the coil portion **12*a*), each of the protection diodes 22_1 to 22_N operates as a voltage limiter circuit of the corresponding superconducting coil 12 (or the coil portion 12*a*), and the superconducting coil 12 (or the coil portion 12*a***) can be protected.

In addition, as shown in FIG. 2, the superconducting magnet device 10 includes an excitation power supply 24 and a current breaker 26 connected in series to the excitation power supply 24. The excitation power supply 24 and the current breaker 26 are disposed outside the vacuum container 14. The current breaker 26 may be, for example, a semiconductor DC breaker such as a DC circuit breaker (DCCB). Feedthrough terminals **28*a* and 28*b*, which are also referred to as current leads, are provided on the wall portion (for example, the bottom plate 14*b* or the top plate 14*a* shown in FIG. 1) of the vacuum container 14 to connect the excitation power supply 24 and the current breaker 26 to the superconducting coil 12 and the protection circuit 20 in the vacuum container 14 for power supply from the excitation power supply 24 to the superconducting coil 12. In addition, a persistent current switch 30 connected in parallel to the superconducting coil 12 and the protection circuit 20 is provided in the vacuum container 14. The excitation power supply 24 is connected to one end of the persistent current switch 30 via the feedthrough terminal 28***a*, and the current breaker 26 is connected to the other end of the persistent current switch 30 via the feedthrough terminal 28*b*.

In a normal operation of the superconducting magnet device 10, the superconducting coil 12, the protection circuit 20, and the persistent current switch 30 in the vacuum container 14 are cooled to a cryogenic temperature equal to or lower than a critical temperature, and the superconducting coil 12 and the persistent current switch 30 are maintained in a superconducting state. First, in a state in which the current breaker 26 is turned on (closed), and the persistent current switch 30 is turned off (open), a current is supplied from the excitation power supply 24 to the superconducting coil 12. Thereafter, the persistent current switch 30 is switched to an on (closed) state, the supply of the current from the excitation power supply 24 is stopped, and the current breaker 26 is switched to an off (open) state. In this way, even when there is no power supply from the excitation power supply 24, the current can continue to flow in a closed circuit in which the superconducting coil 12 and the persistent current switch 30 are connected in series in the superconducting state without substantially attenuating the current. The superconducting coil 12 can generate the magnetic field B shown in FIG. 1.

The protection diode 22 is designed such that the voltage induced across the diode in the normal excitation of the superconducting coil 12 as described above is lower than the forward voltage (usually denoted by VF) of the diode. Therefore, the current does not flow through the protection circuit 20 when the superconducting coil 12 is excited. Even when the superconducting coil 12 is degaussed as a normal operation of the superconducting magnet device 10, the current does not flow through the protection circuit 20 in the same manner.

Meanwhile, in a case where quenching occurs in a certain coil portion 12*a* of the superconducting coil 12, the coil portion 12*a* is transitioned to a normal conducting state, and the voltage across the coil portion 12*a* increases. Then, when the voltage exceeds the forward voltage VF of the protection diode 22 corresponding to the coil portion 12*a*, the protection diode 22 is electrically conducted, and the current can flow through a closed circuit formed by the coil portion 12*a* and the protection diode 22. This can be used to protect the coil portion 12*a* in which quenching has occurred.

However, as described at the beginning of the present specification, in order to dispose the protection circuit 20 in the cryogenic environment together with the superconducting coil 12, the protection diode 22 may be installed at a location exposed to a strong leaked magnetic field from the superconducting coil 12 due to spatial constraints in the vacuum container 14. The present inventors have found that the forward voltage VF of the protection diode 22 increases depending on the direction and magnitude of the magnetic field B acting on the pn junction surface 22*a* of the protection diode 22. There is a concern that the action of increasing the forward voltage VF causes an excessive voltage across the diode before the protection diode 22 is electrically conducted at the time of quenching, thereby causing a risk of occurrence of discharge or the ground fault.

It is known that the forward voltage VF of the protection diode 22 is typically several volts in a steady state, but transiently and significantly (for example, 10 times or more) increases at the moment when the protection diode 22 is switched to an on state, that is, when the current starts to flow. Therefore, in a case where such a transient increase of the forward voltage VF and the action of increasing the forward voltage VF due to the magnetic field B found by the present inventors are combined at the time of the occurrence of quenching, there is a concern that a further large voltage is applied across the protection diode 22, and thus a risk of occurrence of discharge or ground fault is further increased.

Figure 3A:
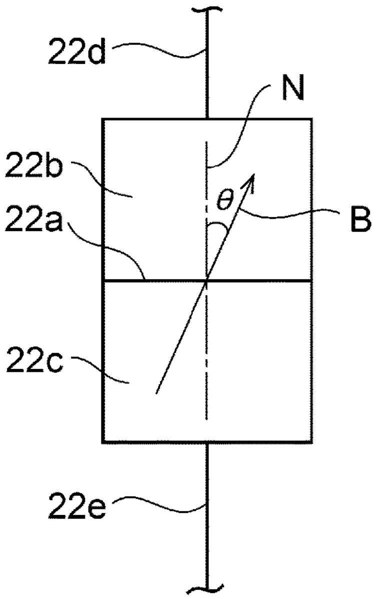
FIG. 3A is a schematic diagram showing a pn junction surface of a protection diode according to the embodiment and a direction of a magnetic field acting thereon.
Figure 3B:
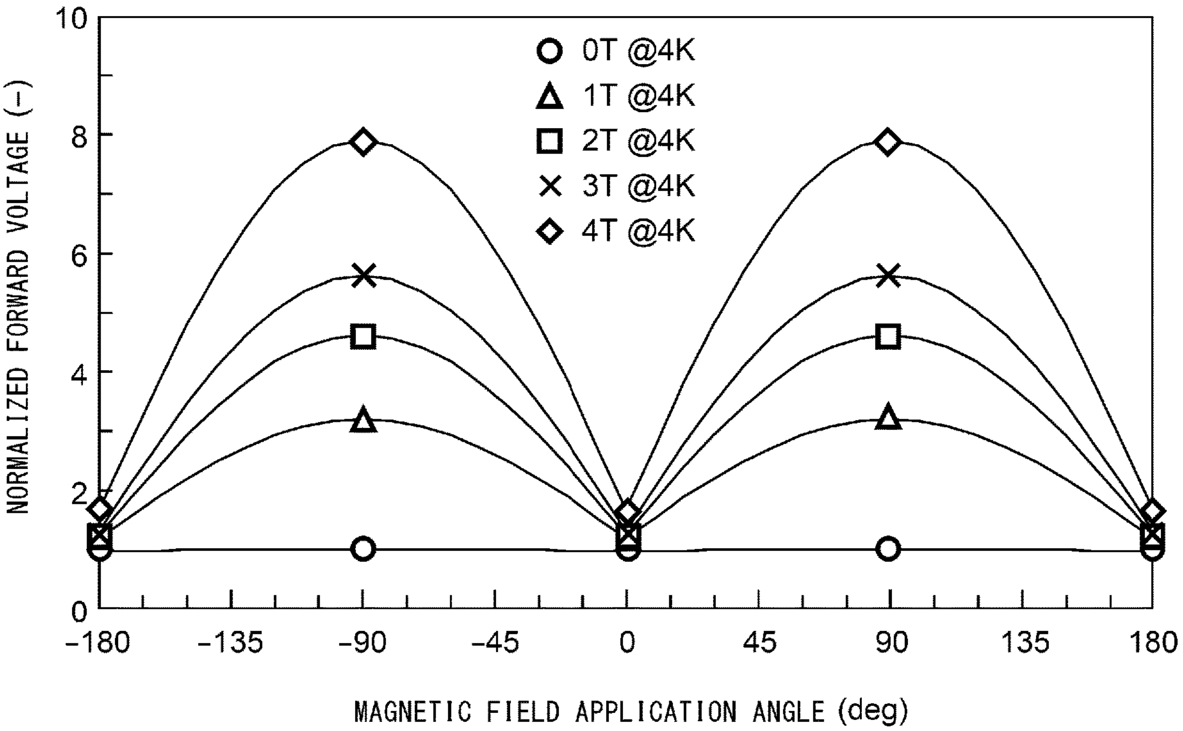
FIG. 3B is a graph showing a relationship between a forward voltage of the protection diode according to the embodiment and a direction of an acting magnetic field.

FIG. 3A is a schematic diagram showing the pn junction surface 22*a* of the protection diode 22 according to the embodiment and a direction of the magnetic field B acting thereon. FIG. 3B is a graph showing a relationship between the forward voltage of the protection diode 22 and a direction of the acting magnetic field B according to the embodiment.

As shown in FIG. 3A, the protection diode 22 includes a p-type semiconductor layer 22*b* and an n-type semiconductor layer 22*c*, and an interface therebetween is the pn junction surface 22*a*. When a voltage exceeding the forward voltage VF is applied between terminals 22*d* and 22*e* at both ends of the protection diode 22, a forward current flows between the terminals 22*d* and 22*e* via the p-type semiconductor layer 22*b*, the pn junction surface 22*a*, and the n-type semiconductor layer 22*c*.

As shown, an angle formed by a normal line N of the pn junction surface 22*a* of the protection diode 22 and the magnetic field B is denoted by θ. As described above, the magnetic field B is a magnetic field generated by the superconducting coil 12 on the pn junction surface 22*a* of the protection diode 22. When the direction of the magnetic field B coincides with the normal line N of the pn junction surface 22*a*, that is, when the magnetic field B is perpendicular to the pn junction surface 22*a*, the angle θ is set to 0 degrees, and when the direction of the magnetic field B is perpendicular to the normal line N of the pn junction surface 22*a*, that is, when the magnetic field B is parallel to the pn junction surface 22*a*, the angle θ is set to 90 degrees.

FIG. 3B is a graph showing a relationship between the forward voltage VF of the protection diode 22 measured by the present inventors and the angle θ, and shows how the forward voltage of the protection diode 22 obtained from forward current-voltage characteristics of the protection diode 22 measured by changing the direction and magnitude of the magnetic field B changes depending on the direction and magnitude of the magnetic field B. A vertical axis of FIG. 3B indicates the forward voltage, and a horizontal axis indicates the angle θ. However, the vertical axis indicates a value (dimensionless number) of a normalized forward voltage where the magnitude of the forward voltage when the magnetic field B is not applied to the pn junction surface 22*a* of the protection diode 22 is 1. The magnitude of the magnetic field B is measured in five ways of 0 T (that is, the magnetic field B is not applied), 1 T, 2 T, 3 T, and 4 T, and the direction of the magnetic field B (that is, the angle θ) is measured in five ways of −180 degrees, −90 degrees, 0 degrees, 90 degrees, and 180 degrees. All the measurements are performed in a state in which the protection diode 22 is cooled to 4 K.

As understood from FIG. 3B, when the angle θ formed by the magnetic field B with respect to the pn junction surface 22*a* of the protection diode 22 is +90 degrees, the forward voltage of the protection diode 22 is significantly increased as compared to when the angle θ is 0 degrees. It can also be seen from FIG. 3B that the forward voltage increases as the magnetic field B increases. It is understood that such an increase in the forward voltage dependent on the magnetic field B occurs, for example, when the magnetic field B exceeding 0.5 T acts on the pn junction surface 22*a* of the protection diode 22.

Therefore, in order to prevent the forward voltage VF of the protection diode 22 from becoming excessive due to the magnetic field B, the protection diode 22 may be disposed such that the direction of the magnetic field B generated by the superconducting coil 12 on the pn junction surface 22*a* of the protection diode 22 is not perpendicular to the normal line N of the pn junction surface 22*a*. Preferably, the protection diode 22 is disposed such that the direction of the magnetic field B is substantially parallel to the normal line N of the pn junction surface 22*a*.

When the angle θ is 0 degrees, the forward voltage becomes the minimum, and when the angle θ is 90 degrees, the forward voltage becomes the maximum. Therefore, it is presumed that a component of the magnetic field B in a normal direction of the pn junction surface 22*a* contributes to the increase in the forward voltage. Therefore, it is expected that a relationship between the forward voltage VF, the magnetic field B, and the angle θ can be approximated by the following expression.

$$VF = V0 + \mathrm{V\_MF} \times B \times |\sin\theta|$$

Here, V0 represents a forward voltage when the magnetic field B is not applied, V_MF is a coefficient (unit is V/T) representing an influence of the magnetic field B, and B represents the magnitude of the magnetic field B. Therefore, a second term on the right side of the above expression represents an amount of increase in the forward voltage due to the magnetic field B.

Therefore, in order to suppress the influence of the magnetic field B (that is, the second term of the right side) to 10% or less of the forward voltage V0 when the magnetic field B is not applied, the angle θ may be within about 6 degrees (≈arcsin (0.1)). Similarly, in order to suppress the influence of the magnetic field B to 20% or less, or 30% or less, or 50% or less of V0, the angle θ may be within about 12 degrees (≈arcsin (0.2)), within about 17 degrees (≈arcsin (0.3)), or within about 30 degrees (≈arcsin (0.5)), respectively.

Therefore, the protection diode 22 may be disposed such that the direction of the magnetic field B forms an angle of within about 6 degrees with respect to the normal line N of the pn junction surface 22*a*. The protection diode 22 may be disposed such that the direction of the magnetic field B forms an angle of about within 12 degrees with respect to the normal line N of the pn junction surface 22*a*. The protection diode 22 may be disposed such that the direction of the magnetic field B forms an angle of within about 17 degrees with respect to the normal line N of the pn junction surface 22*a*. The protection diode 22 may be disposed such that the direction of the magnetic field B forms an angle of within about 30 degrees with respect to the normal line N of the pn junction surface 22*a*.

It is considered that these conditions for the angle θ of the magnetic field B are not necessarily satisfied over the entire volume of the protection diode 22 or over the entire region of the pn junction surface 22*a*. It is considered that if the conditions for the angle of the magnetic field B are satisfied in at least a part (for example, a central portion) of the pn junction surface 22*a*, a sufficient effect of suppressing the action of increasing the forward voltage can be obtained.

It is considered that the action of increasing the forward voltage of the protection diode 22 due to the magnetic field B is limited to a state in which the protection diode 22 is cooled to, for example, a cryogenic temperature of 20 K or lower. It is considered that, at a temperature higher than the cryogenic temperature, a lattice vibration on the pn junction surface 22*a* exceeds the influence of the magnetic field B, and little or no increase in the forward voltage due to the magnetic field B occurs.

As described above, in the superconducting magnet device 10 according to the embodiment, the protection diode 22 is disposed such that the direction of the magnetic field B generated by the superconducting coil 12 on the pn junction surface 22*a* of the protection diode 22 is not perpendicular to the normal line N of the pn junction surface 22*a*, preferably substantially parallel to the normal line N of the pn junction surface 22*a*. Accordingly, the action of increasing the forward voltage of the protection diode 22 due to the magnetic field B can be suppressed, and the protection diode 22 can be operated at an appropriate forward voltage.

Figure 4:
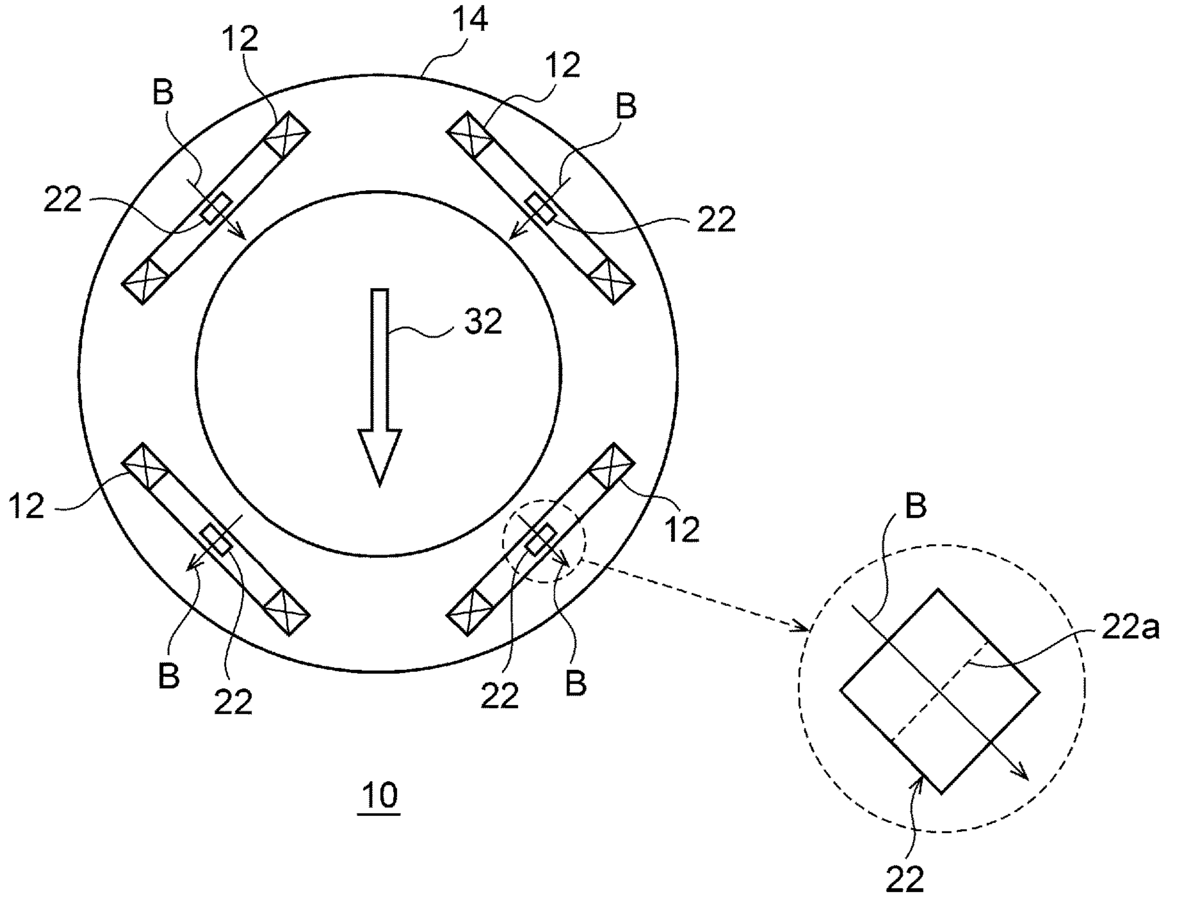
FIG. 4 is a diagram schematically showing an exemplary disposition of protection diodes 22 in the superconducting magnet device according to the embodiment.

FIG. 4 is a diagram schematically showing an exemplary disposition of the protection diodes 22 in the superconducting magnet device 10 according to the embodiment. The superconducting magnet device 10 includes the cylindrical vacuum container 14 having a hollow central portion and a plurality of (four in this example) superconducting coils 12 disposed in the vacuum container 14. The superconducting coils 12 are disposed between a cylindrical outer peripheral wall and a cylindrical inner peripheral wall of the vacuum container 14 in a posture in which a center axis of each coil intersects a center axis of the vacuum container 14. Therefore, the superconducting coils 12 generate the magnetic fields B directed outward (or inward) in a radial direction of the vacuum container 14, respectively, and a combined magnetic field 32 thereof has a direction perpendicular to the center axis of the vacuum container 14. In a case where the center axis of the vacuum container 14 is in a vertical direction, the combined magnetic field 32 is directed in a horizontal direction.

The protection diode 22 is provided for each of the superconducting coils 12, and is disposed inside the superconducting coil 12 in this example. Each of the protection diodes 22 is disposed such that the normal line of the pn junction surface 22*a* coincides with the center axis of each of the superconducting coils 12 (that is, a magnetic field direction of each of the superconducting coils 12). Since the magnetic fields B are substantially aligned in a direction parallel to the center axis of the coil regardless of the position inside the superconducting coil 12, the protection diode 22 may be disposed on the center axis of the coil, or may be disposed at a location deviated from the center axis of the coil. In this way, as described above, the action of increasing the forward voltage of the protection diode 22 due to the magnetic field B can be suppressed, and the protection diode 22 can be operated at an appropriate forward voltage.

In addition, since the inside of the superconducting coil 12 is a region in which a strong magnetic field generated by the superconducting coil 12 acts, the inside of the superconducting coil 12 is not a suitable place for installing other components (for example, sensors) of the superconducting magnet device 10, and is an empty space in many cases. Therefore, by disposing the protection diode 22 inside the superconducting coil 12, the protection diode 22 can be easily installed in the vacuum container 14 without interfering with other components (the protection diode 22 can be made less susceptible to spatial constraints in the vacuum container 14).

The present invention has been described above based on examples. It will be understood by those skilled in the art that the present invention is not limited to the above-described embodiment, and that various modifications are possible, and such modifications are also within the scope of the present invention. Various features described in relation to the certain embodiment are also applicable to other embodiments. A new embodiment generated by combination of the embodiments has effects of each of the embodiments to be combined.

In the above-described embodiment, the protection diode 22 disposed inside the superconducting coil 12 has been described as an example. However, the protection diode 22 can be disposed in other locations. By disposing the protection diode 22 outside the superconducting coil 12, the direction of the magnetic field acting on the pn junction surface 22*a* of the protection diode 22 can be made non-perpendicular to the normal line N of the pn junction surface 22*a*, or preferably substantially parallel to the normal line N of the pn junction surface 22*a*.

Figure 5A:
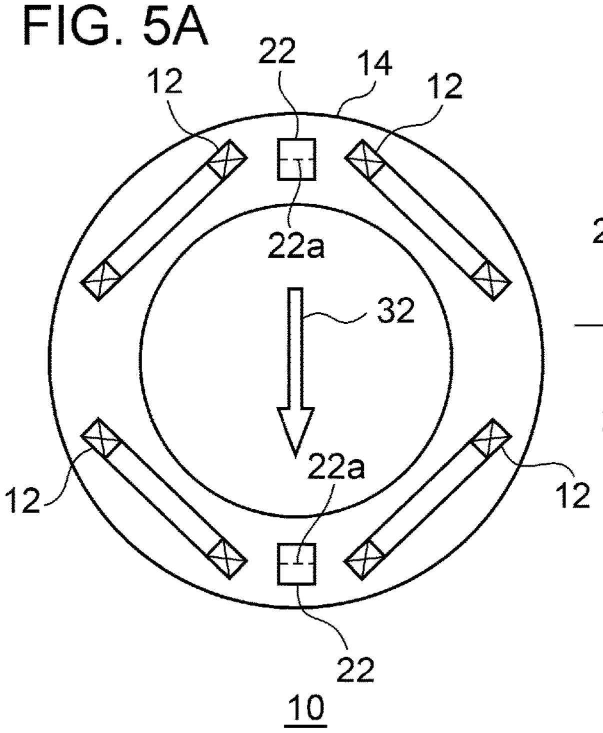
FIGS. 5A and 5B are diagrams schematically showing an exemplary disposition of the protection diodes in the superconducting magnet device according to the embodiment.
Figure 5B:
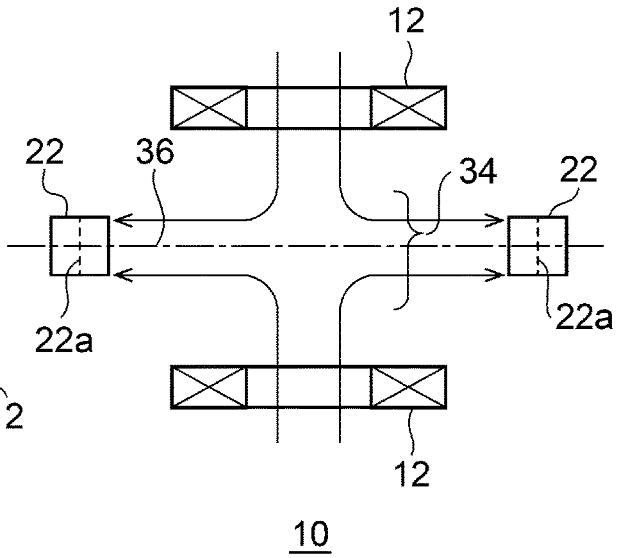

FIGS. 5A and 5B are diagrams schematically showing an exemplary disposition of the protection diodes 22 in the superconducting magnet device 10 according to the embodiment. The protection diode 22 may be disposed outside the plurality of superconducting coils 12 such that the direction of the combined magnetic field 32 generated by the plurality of superconducting coils 12 on the pn junction surface 22*a* of the protection diode 22 is not perpendicular to the normal line of the pn junction surface 22*a*, or preferably, is substantially parallel to the normal line of the pn junction surface 22*a*.

In FIG. 5A, as in FIG. 4, the superconducting magnet device 10 includes four superconducting coils 12 in the vacuum container 14. In this case, the protection diode 22 may be disposed between two superconducting coils 12 adjacent to each other in a circumferential direction of the vacuum container 14. In this way, the protection diode 22 can be disposed such that the normal line of the pn junction surface 22*a* of the protection diode 22 substantially coincides with the direction of the combined magnetic field 32.

In FIG. 5B, the superconducting magnet device 10 includes a pair of the superconducting coils 12 disposed to face each other to generate a cusp magnetic field 34. In this case, the protection diode 22 may be disposed on a median plane 36 of the cusp magnetic field 34. In this way, the protection diode 22 can be disposed such that the normal line of the pn junction surface 22*a* of the protection diode 22 substantially coincides with a direction of the cusp magnetic field 34.

Although the present invention has been described using specific terms based on the embodiment, the embodiment only shows one aspect of the principle and application of the invention, and the embodiment allows for many modifications and changes in arrangement without departing from the concept of the invention as defined in the claims.

INDUSTRIAL APPLICABILITY

The present invention can be used in the field of superconducting magnet devices.

It should be understood that the invention is not limited to the above-described embodiment, but may be modified into various forms on the basis of the spirit of the invention. Additionally, the modifications are included in the scope of the invention.

What is claimed is:

1. A superconducting magnet device comprising:

a superconducting coil disposed in a cryogenic environment; and a protection diode disposed in the cryogenic environment and connected to the superconducting coil, the protection diode being disposed such that a direction of a magnetic field generated by the superconducting coil on a pn junction surface of the protection diode forms an angle within about 30 degrees with respect to a normal line of the pn junction surface.

2. The superconducting magnet device according to claim 1, wherein the protection diode is disposed such that the direction of the magnetic field generated by the superconducting coil on the pn junction surface is substantially parallel to the normal line of the pn junction surface.

3. The superconducting magnet device according to claim 1, wherein the protection diode is disposed inside the superconducting coil.

4. The superconducting magnet device according to claim 1, wherein the superconducting magnet device includes a plurality of the superconducting coils disposed in the cryogenic environment, and the protection diode is disposed outside the plurality of superconducting coils such that a direction of a combined magnetic field generated by the plurality of superconducting coils on the pn junction surface forms an angle within about 30 degrees with respect to the normal line of the pn junction surface.

5. A cryostat comprising:

a vacuum container;

a cryocooler installed in the vacuum container;

a superconducting coil disposed in the vacuum container and cooled by the cryocooler; and a protection diode disposed in the vacuum container, cooled by the cryocooler, and connected to the superconducting coil, the protection diode being disposed such that a direction of a magnetic field generated by the superconducting coil on a pn junction surface of the protection diode forms an angle within about 30 degrees with respect to a normal line of the pn junction surface.

* * * * *